United States Patent

[11] 3,629,827

[72] Inventors David L. Johnston;
Paul E. Nelson, both of Rochester, Minn.

[21] Appl. No. 790,616
[22] Filed Jan. 13, 1969
[45] Patented Dec. 21, 1971

[73] Assignee International Business Machines Corporation
Armonk, N.Y.

[54] SYSTEM AND METHOD FOR DETERMINING THE POSITION, HEIGHT AND WIDTH OF A CHARACTER MARKING
13 Claims, 26 Drawing Figs.

[52] U.S. Cl. 340/146.3 H, 178/7.7
[51] Int. Cl. G06k 9/04
[50] Field of Search 340/146.3; 178/6.8, 7.2, 7.6, 7.7

[56] References Cited

UNITED STATES PATENTS

| | | | |
|---|---|---|---|
| 3,050,581 | 8/1962 | Bomba et al. | 340/146.3 UX |
| 3,295,105 | 12/1966 | Gray et al. | 340/146.3 |
| 3,443,027 | 5/1969 | Dohler | 340/146.3 X |
| 3,303,465 | 2/1967 | Essinger et al. | 340/146.3 |

OTHER REFERENCES

Brownback et al., IBM Technical Disclosure Bulletin "High-Speed Registration for Position Code Scanning," Vol. 9 No. 11 April, 1967. pp. 1593–1595.

*Primary Examiner*—Maynard R. Wilbur
*Assistant Examiner*—Leo H. Boudreau
*Attorney*—Sughrue, Rothwell, Mion, Zinn & MacPeak

ABSTRACT: A beam is linearly swept across a character marking and stepped in directions perpendicular to the sweep. The extremes of the marking in four orthogonal directions, as determined during the sweep, are stored for use in controlling the positioning of a recognition scanning beam.

INVENTORS
DAVID L. JOHNSTON
PAUL E. NELSON

BY Sughrue, Rothwell, Mion, Zinn & Macpeak
ATTORNEYS

SYSTEM AND METHOD FOR DETERMINING THE POSITION, HEIGHT AND WIDTH OF A CHARACTER MARKING

BACKGROUND OF THE INVENTION

1. Field of the Invention

The invention relates to a system and method for use with optical character recognition (OCR), and more particularly, for use in determining the bounds or extremities of a character marking.

2. Description of the Prior Art

Before a character can be recognized by an OCR system, the character must first be found and normalized horizontally and vertically. Prior art systems, unlike the present invention, utilize full size vertical scans to locate characters and this is more time consuming. Further, prior art systems are perimeter sensitive when determining the horizontal and vertical extremities of the characters and thus are slower in operation. Additionally, prior art systems were time dependent and required precision current sources and precision rasters; whereas in the present invention, low tolerance current sources are used and the scan for determining character size is not a precision raster. Also, in this invention, it is possible to perform the character size determining operation from the right or left hand sides of a character because the invention incorporates bidirectional scanning. Thus, it is possible to read a line of characters either from left to right or from right to left. Generally, name fields are read left to right and number fields are read low order position first, i.e., right to left.

Prior art systems also found it difficult to handle disjointed and broken characters. Some systems would treat the breaks as the end of the character and would not locate the rest of the character.

The circle-scan mode frequently is not adequate for disjointed and broken characters. When the scan comes to a break in a character, the equipment treats the break as if it were the end of the character and does not locate the rest of the character.

SUMMARY OF THE INVENTION

The present invention uses a linear scan to locate and normalize the character marking. The invention can accomplish this task faster than the prior art systems and with less of the analog circuitry which requires frequent adjustment. The cost of the linear scan system is significantly less than the prior art circular scan system.

The present invention also has the advantageous feature of being able to normalize broken or disjointed characters significantly better than the circular scan systems.

DESCRIPTION OF THE PREFERRED EMBODIMENT

Figures 1A, 1B:
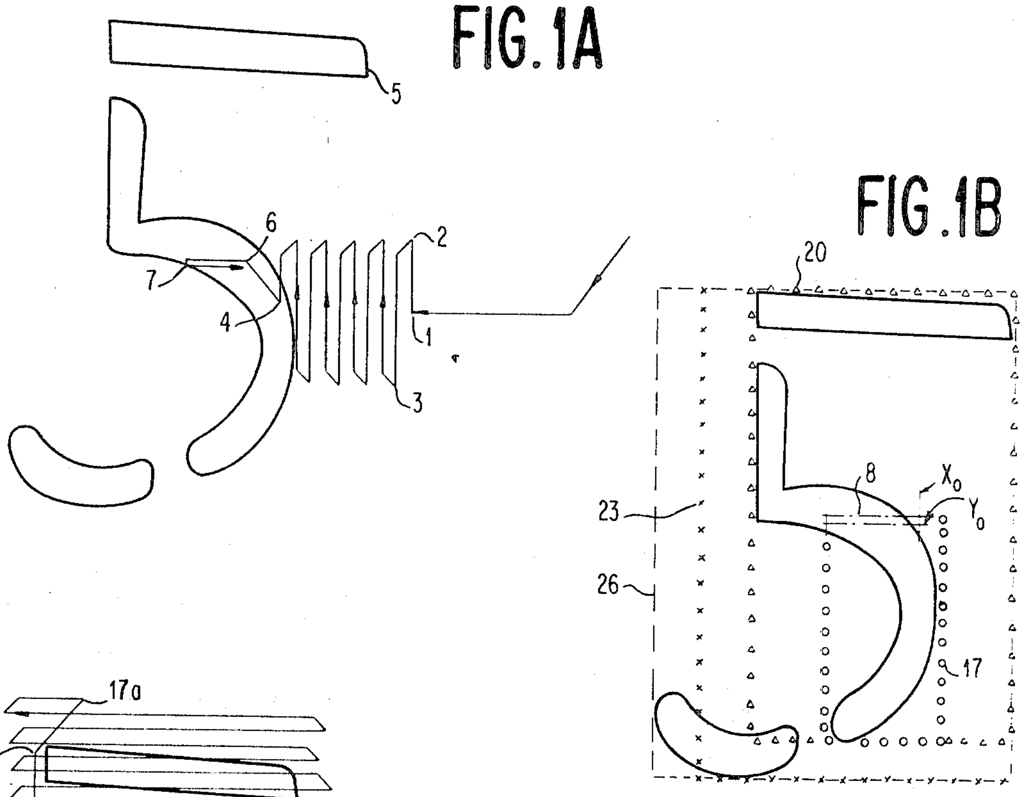
FIGS. 1A through 1D are illustrations of a typical scan path along a character and the stored positions of the extremities of the character as determined at various stages of the scan.

In scanning the character marking to determine the left, right, upper and lower extremities of the character, the scanning spot, which is typically the result of beam movement, begins at some point 1 as illustrated in FIG. 1A. In this example, the spot is stepped to the left, so it proceeds to point 2, point 3, etc., until it strikes the character 5 at point 4. The spot then sweeps through points 6 and 7 to begin the scan.

As explained with the specific logic circuits used, whether the top or bottom half of the character is scanned first depends upon the direction of scan at the instant of intersection of the character. In this example, the bottom half of the character will be scanned first.

Now the known range of the character matrix is shown by the small box in region 8 of FIG. 1B. The scan begins at point 9 in FIG. 1C, through point 10, and back and forth to point 11, where the black video signal, which indicates that the spot is on the character, runs out. The spot continues to scan for a predetermined short distance, through points 12, 13 and 14, after which the logic circuits return the beam through point 15 to point 16 to begin scanning the top half of the character. Now the known range of the character matrix is shown by the larger box 17 in FIG. 1B.

The character is then scanned from point 16 to point 17*a*, a predetermined distance beyond the upper end of the character. The spot then returns via point 18 to point 19. The known limit of the character matrix is then shown by box 20 in FIG. 1B.

Figure 1C:
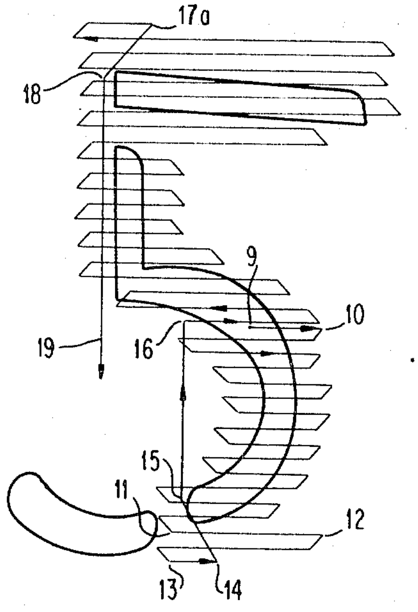
Figure 1D:
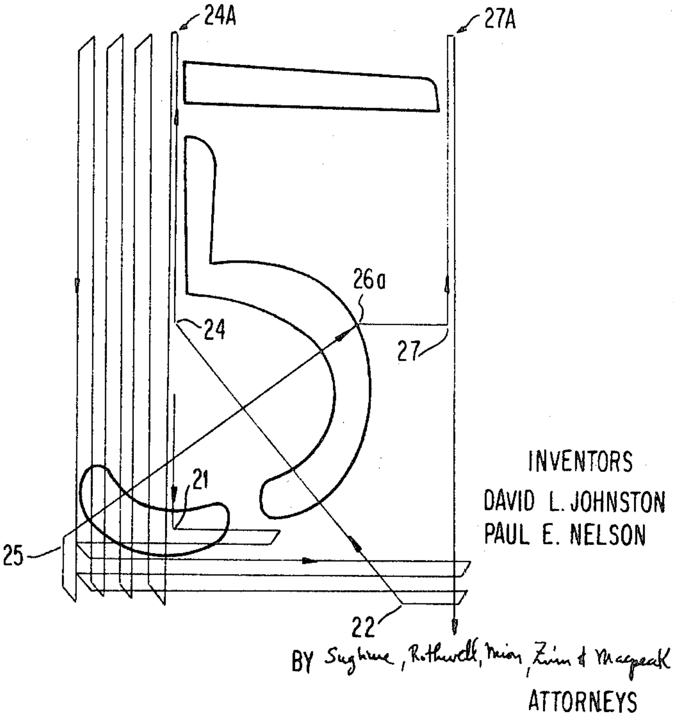

In FIG. 1D, the spot continues its movement down to point 21, where it rescans the bottom half of the character to locate any better bottom. In this example, it finds a better bottom and scans down to point 22, a predetermined distance below the now known bottom. If the character were not broken, the best bottom would have been found on the first bottom scan. The known range of the character is now shown by box 23 in FIG. 1B.

The system now begins a vertical scan by movement of the spot to point 24 in FIG. 1D. The scan together with steps to the left, continues to point 25, where the known character range is given by box 26 in FIG. 1B.

The system then sweeps right, through point 26*a* to point 27. A scan produces no black video, resulting in no expansion of the known character range.

Figure 2:
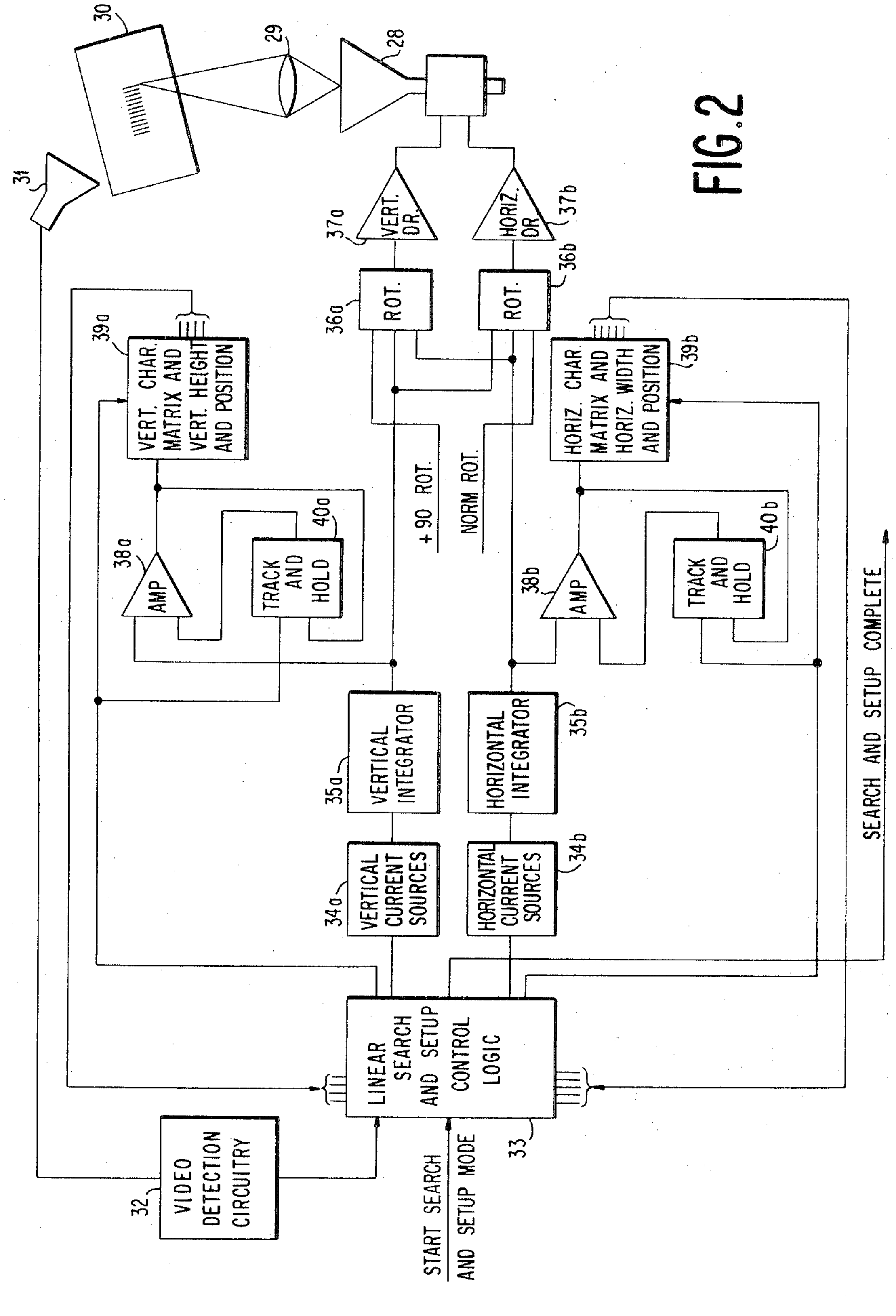
FIG. 2 is an overall block diagram of the system of the present invention.

FIG. 2 is an overall block diagram of the disclosed embodiment of the invention. A cathode-ray tube and yoke 28 provide a scanning light beam through a lens 29 onto a document 30. A video pickup tube 31 provides a video output to a video detection circuit 32. Circuit 32 provides a signal indicating the presence or absence of black video, which indicates the presence or absence of a marking at the spot where the beam intersects the document, to a linear search and setup control logic system 33.

Logic system controls vertical and horizontal current sources 34*a* and 34*b*, switching them on and off to control the magnitude and polarity of the sources. The current source blocks comprise a number of sources of direct current of differing magnitudes and polarities, arranged to be switched in or out of the circuit by switching signals operating current switches, which are analogous to relays. The outputs of the vertical and horizontal current sources are integrated by vertical and horizontal integrators 35*a* and 35*b* to provide vertical and horizontal ramp signals for controlling the sweep of the beam of the cathode-ray tube 28.

Rotation logic circuits 36*a* and 36*b* receive the ramp signals and may be controlled by rotation signals to rotate the scan by 90°, if appropriate, before application of the scan signals to vertical and horizontal drive amplifiers 37*a* and 37*b*, which drive the yoke of the cathode-ray tube 28.

The signals from integrators 35*a* and 35*b* are also applied through vertical and horizontal summing amplifiers 38*a* and 38*b* to vertical and horizontal character matrix and height, width, and position determination circuits 39*a* and 39*b*. Circuits 39*a* and 39*b* are controlled by logic circuits 33 to store the maximum upper, lower, right and left extremities of the character and to make various comparisons between this data and predetermined values.

Track and hold amplifiers 40*a* and 40*b* are associated with amplifiers 38*a* and 38*b* and serve to zero the outputs of the amplifiers at the point where each character is first intersected. This zero function permits amplifiers 38*a* and 38*b* to provide the rather small voltage excursions which are generated at the output of integrators during the scanning of the character without being saturated by the voltage representing the position of the character in the read area. This amplification of the voltage excursions allows more accurate storage of the character boundaries and more accurate determination of beam position relative to the character matrix.

Figures 3, 4, 5, 6:
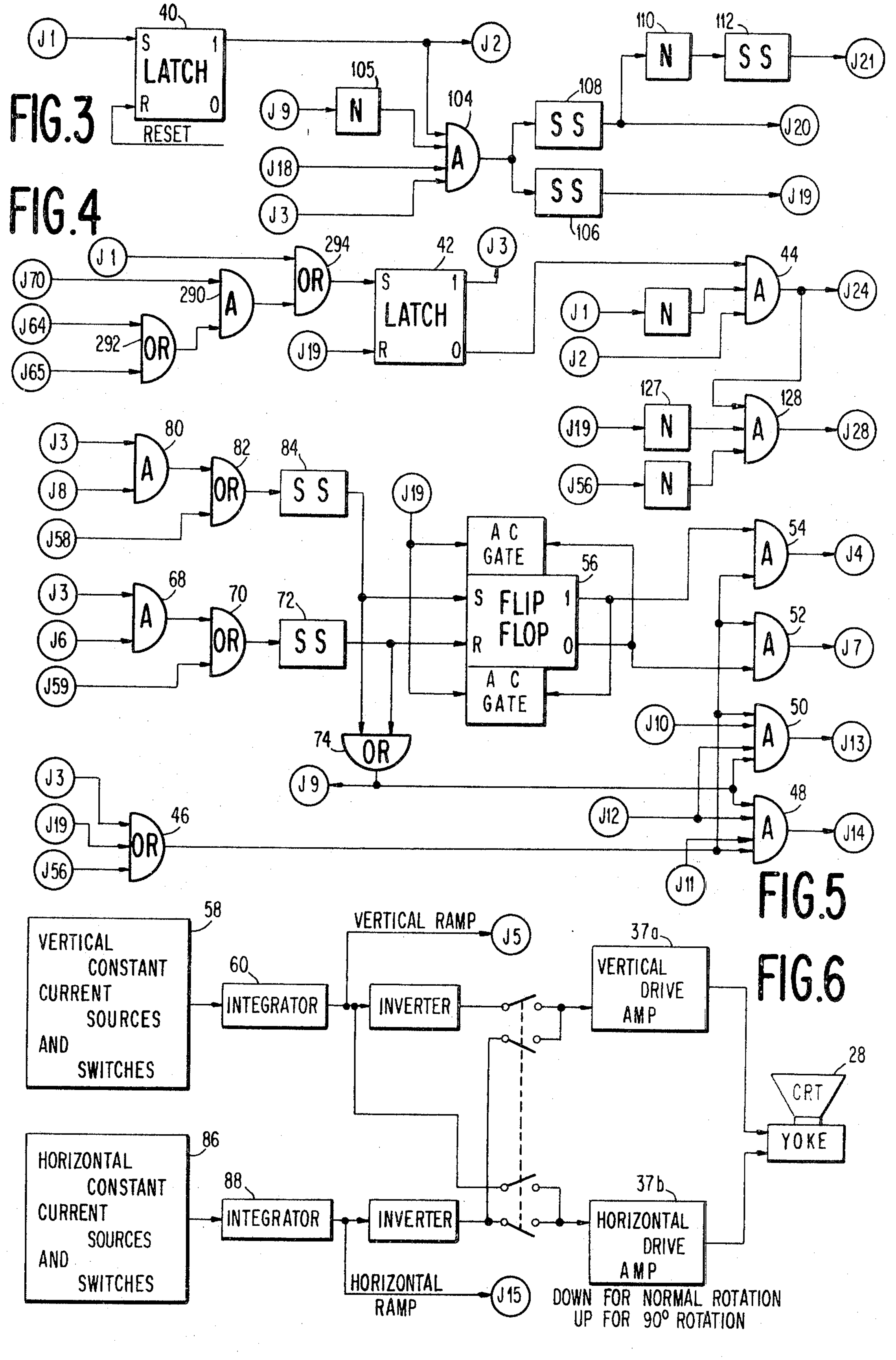
FIGS. 3, 4 and 5 are detailed schematic diagrams of the logic system for generating linear search control and search raster signals.
FIGS. 6, 7 and 8 are detailed schematic diagrams of character reset amplifiers, character limit track and hold systems and cathode-ray tube scan control systems.

The arrival of the beam at some predetermined beginning point 1 causes the application of a signal to junction J1 in FIGS. 3 and 4 to set the linear search mode. The J1 signal sets flip latches 40 and 42 in FIGS. 3 and 4, thereby initiating the high-speed 60-mil search raster indicated at points 2 and 3 in FIG. 1A. Latch 40, when ON, provides a signal via junction J2 to an AND-gate 44 in FIG. 4.

Latch 40 is reset, as a function of the operation of the recognition-scanning system, when the end of a line is reached, or when the raster is positioned to scan a character, or when a Group Erase (line delete) symbol is detected, indicating no further scanning of the line need be done.

Latch 42, when ON, provides a signal, via junction J3, to an OR-gate 46 in FIG. 5. The resulting output signal from OR-gate 46 enables or partially enables each of AND-gates 48, 50, 52 and 54. If flip-flop 56 is ON with gate 54 so enabled, an UP output is applied to a junction J4, thereby causing the search beam to sweep upward at, for example, 5,000 inches per second.

In FIG. 6, a vertical constant current source in block 58 will be switched ON by the signal at J4. The constant current is integrated by a vertical integrator 60 to provide a vertical ramp voltage used to drive the search beam upward in this example. The vertical ramp voltage is also applied via junction J5 to the vertical comparison circuitry of FIG. 7.

The signal from junction J5 passes through a vertical summing amplifier 62 which was zeroed by a track and hold amplifier 63 until the signal from latch 42 via junction J3 caused amplifier 63 to hold. The signal is then compared in a comparator 64 with a fixed voltage from resistive divider 66. Amplifier 62 typically has a gain of about 13. This comparison determines when the search beam has risen to the height of point 2 in FIG. 1A. When comparator indicates that this condition is met and, therefore, that the vertical scan is greater than the raster top, it applies an UP signal via junction J6 to the circuit of FIG. 5, and there to an input of an AND-gate 68.

The ON signal from latch 42 has already enabled AND-gate 68, whereby it passes an output through an OR-gate 70, a single-shot device 72 to the RESET terminal of flip-flop 56 and to an input of an OR-gate 74. Resetting flip-flop 56 causes an UP signal to be applied to the AND-gate 52, already enabled, whereby a signal is applied to junction J7 to drive the search beam down at, for example, 5,000 inches per second.

The signal from junction J7 switches the vertical constant current sources in block 58 to provide a signal of opposite polarity. This causes integrator 60 to create an opposite-going vertical ramp on junction J5. When comparator 76 indicates that the vertical ramp voltage equals the voltage on divider 78, an UP output signal is applied to junction J8, indicating that the beam has reached the vertical level of point 3 in FIG. 1A.

The signal from junction J8 is applied, in FIG. 5, through an (enabled) AND-gate 80, an OR-gate 82 and a single-shot device 84 to the SET terminal of flip-flop 56 and the other input of OR-gate 74. This SETS again the flip-flop, causing the beam to rise.

Single-shot devices 72 and 84 are both arranged to produce an output pulse of about, for example, 2.8 microseconds UP duration when an UP input signal is applied. These pulses pass through OR-gate 74 to junction J9 and also to inputs of AND-gates 48 and 50.

Figures 9, 10:
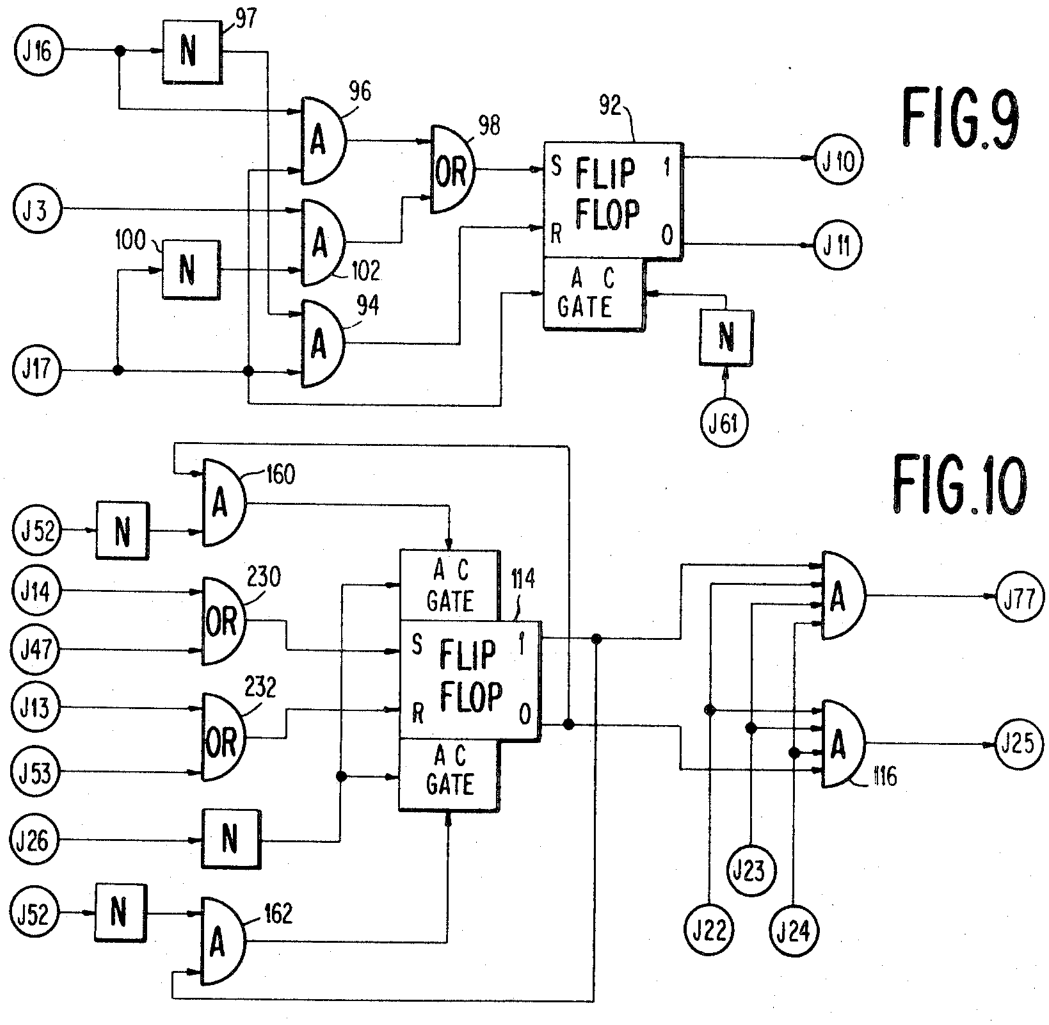
FIGS. 9, 22 and 23 are detailed schematic diagrams of the linear setup complete and step direction control signal systems.
FIGS. 10 and 12 are detailed schematic diagrams of the systems for character setup sweep generation.
Figure 20:
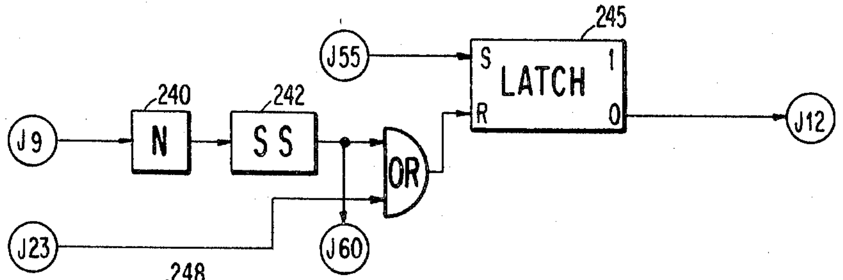

AND-gates 48 and 50 respectively receive input signals from junctions J10 and J11, derived from the circuit of FIG. 9. The signals on junctions J10 and J11 respectively indicate, when UP, that the search step should be left and should be right. The two UP (or DOWN) conditions are mutually exclusive. Another input to AND-gates 48 and 50 is derived via junction J12 from FIG. 20, indicating that horizontal stepping is not inhibited. Under these conditions, gates 48 and 50 pass 2.8-microsecond pulses to one of junctions J13 and J14 after the beam reaches points 2, 3 and other such points, thereby to cause short horizontal steps at these points. The beam actually moves diagonally for these steps because the vertical deflection continues. The choice of junction J13 or J14 as the signal carrier determines the direction of the horizontal movement of the beam. The horizontal stepping may be, for example, at 3,000 inches per second.

The J13 and J14 signal is applied to block 86, FIG. 6, to switch appropriate constant current sources to the input of integrator 88, thereby providing a horizontal (stepping) ramp to junction J15.

Figures 7, 8:
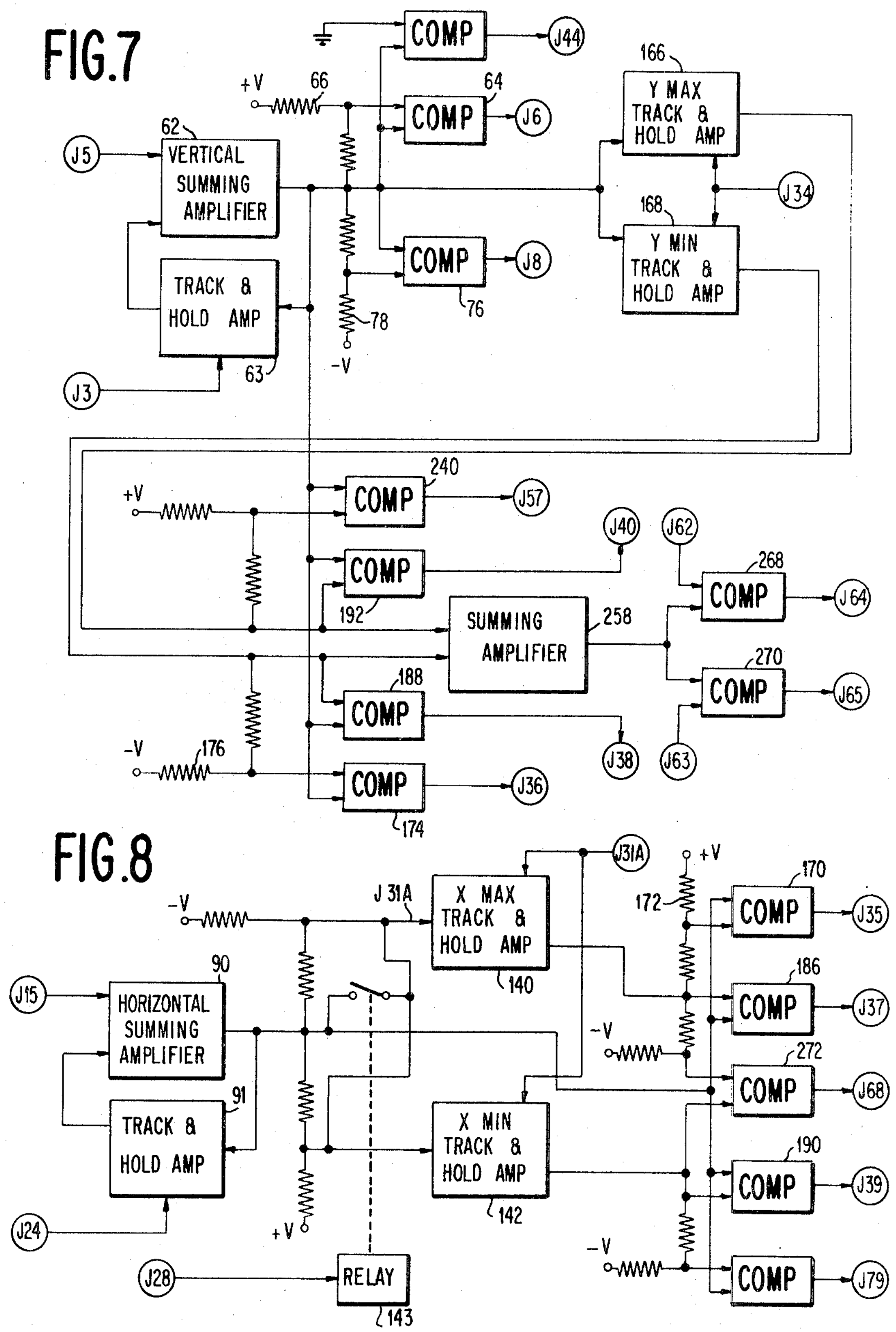

FIG. 8 represents the horizontal comparison circuitry. The horizontal ramp signal on J15 is applied to the input of the horizontal summing amplifier 90 in FIG. 8, which is zeroed by a track and hold amplifier 91.

The search raster may be arranged to search either left-to-right (forward) or right-to-left (backward). Junction J16 in FIG. 9 is the read direction signal and it will be UP if the read operation is to be backwards. Junction J17 when UP indicates that the system is operating in a bidirectional read mode. When in this bidirectional read mode, flip-flop 92 will be set or reset, depending upon whether the read backwards signal on J16 is UP or DOWN.

In the bidirectional read mode, an UP signal is applied to AND-gate 94 and to AND-gate 96. If the read backwards signal is UP, an UP signal is applied to gate 96 and inverter 97 provides a DOWN signal to gate 94, thereby setting flip-flop 92 through OR-gate 98. But, if the read backwards signal is DOWN, a DOWN signal is applied to gate 96 and inverter 97 provides an UP signal to gate 94, thereby resetting flip-flop 92. If the system is not in the bidirectional read mode, it is always in the read backwards mode in which case inverter 100 provides an UP signal to AND-gate 102, enabled by J3, indicating latch 42 on, to set flip-flop 92 through OR-gate 98. In the rest of this specification, the read backwards mode is assumed.

At point 4, where the beam meets the numeral 5 in FIG. 1A, a black video signal occurs (becomes UP) on junction J18 in FIG. 3, where it is applied to an input of AND-gate 104. When no horizontal step is in process, junction J9 has no UP pulse, so an inverter 105 can provide an UP input to AND-gate 104. An UP signal on junction J3 for latch 42 ON and another UP input for AND-gate 104 for latch 40 ON cause gate 104 to pass an output signal to two single-shot devices 106 and 108. Device 106 provides a 2.8-microsecond pulse to a junction J19. Device 108 provides a 5.6-microsecond pulse to a junction J20 and through an inverter 110 to another single-shot device 112, which provides a 5.6-microsecond pulse to a junction J21.

The pulse on junction J19 from single-shot 106 resets latch 42 in FIG. 4, toggles flip-flop 56 in FIG. 5, and passes through OR-gate 46 in FIG. 5. The 2.8-microsecond pulse through OR-gate 46 passes through AND-gate 54, generating a 2.8-microsecond sweep-up pulse to move the beam (in one component) up from point 4 to point 6.

Flip-flop 114 is FIG. 10 was previously reset by AND 50 via J13, providing an UP signal to AND-gate 116. Gate 116 also receives via junction J22, a NOT XY INITIALIZE signal from latch 117 in FIG. 15, and via junction J23, a NOT VERTICAL BLANK SCAN CHECK signal from latch 118 in FIG. 15. Latches 117 and 118 are normally reset, enabling gate 116. The character setup control signal on junction J24 from AND-gate 44 (Figure 4) passes through enabled AND-gate 116 to junction J25 to provide a signal to block 86 to cause the beam to sweep left at, for example, 5,000 inches per second.

A short interval later, at point 7, single-shot device 112 puts a signal on junction J21 to turn the beam around. J21 applies the signal through an OR-gate 120 to an AND-gate 122, FIG. 11. When enabled, AND-gate 122 passes the signal through an OR-gate 124 and a 2.8-microsecond single-shot device 126 to junction J26, and through OR gate to junction J27. From J26, the signal is applied through AC gates in flip-flop 114, FIG. 10, to toggle the flip-flop.

Figure 11:
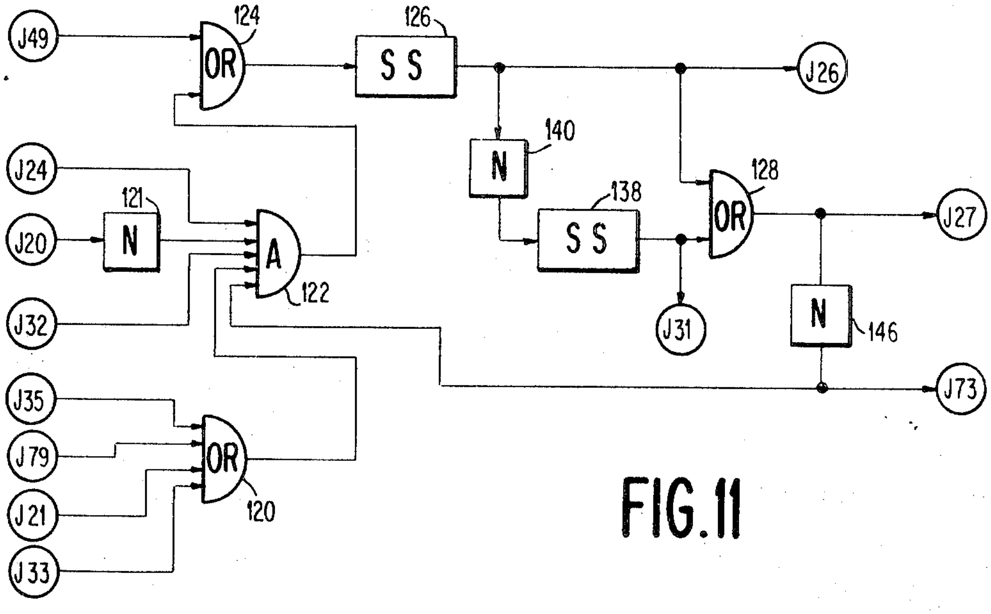
FIGS. 11, 13 and 14 are detailed schematic diagrams of the systems for character setup step signals and matrix setup control signals.

Note that during the sweep from point 4 to point 7, FIG. 1*a*, single-shot 108, FIG. 3, provides an UP output to junction J20 inhibiting AND-gate 122, firing inverter 121, FIG. 11, thereby preventing the output from OR-gate 120 from causing a turnaround during the sweep from point 4 to point 7.

No vertical step is down at point 7. When single-shot 126 fires, it normally passes through either AND-gate 130 or 132 in FIG. 12, passing outputs respectively to junctions J29 and J30, depending upon the condition of a flip-flop 134. The gates 130 and 132 are inhibited when latch 36 is set by single-shot 106 and enabled when latch 136 is reset by a single-shot 138 from an inverter 140 and single-shot 126. The initial step at point 7 is inhibited by latch 136. The direction of subsequent steps is determined by which of gates 130 and 132 is enabled by flip-flop 134.

The state of flip-flop 134 is preset by which of AND-gates 52 and 54 is energized, which is determined during the sweep from point 4 to point 6. In the example given, the bottom part of the character is scanned first.

After the initial firing of single-shot 126 at point 7, single-shot 138 fires, resetting latch 136. This resetting causes all subsequent firing of single-shot 126 to cause vertical steps.

During the sweep from point 4 to point 7, the X MAX and X MIN track and hold amplifiers 140 and 142 (FIG. 8) are allowed to set via junction J31A. When single-shot 108 (FIG. 3) fires, a pulse is applied to junction J20, which is applied to an OR-gate 144 in FIG. 13, thereby applying the pulse via junction J31A to the track and hold amplifiers. Thus, the X MAX amplifier 140 is set at point 4 and X MIN amplifier 142 is set at point 7. The character matrix is now set up as designated by the region 8 in FIG. 1B. A device 143, illustrated for ease of understanding as a relay, is used to eliminate a shift of the horizontal values in response to a shift control signal. In practice, device 143 would be a current switch to provide the necessary speed.

Referring to FIG. 1C, the system now sets up the matrix for the bottom half of the character. At point 9, single-shot 138 (FIG. 11) runs out, applying a DOWN signal to an inverter 146, resulting in an UP output applied back to an input of AND-gate 122, enabling gate 122. Thus, gate 122 can pass any of the signals applied to it via the inputs of OR-gate 120.

Since black video on junction J18 (FIG. 13) is UP at point 9, and AND-gate 8 is enabled, allowing X MAX, indicated by amplifier 140, to be moved out to the right edge of the black video portion of the beam track.

At point 10 (FIG. 1C), black video on junction J18 (FIG. 14) has been down for long enough (1 microsecond) for an inverter 150 and delay element 152 to provide an UP signal through an OR-gate 154 via a junction J32 to AND-gate 122 (FIG. 11).

Inverter 150 also supplies an UP signal 25 through an AND-gate 156 and a single-shot 158 via a junction J33, through OR-gate 120 to AND-gate 122, satisfying gate 122. The output of gate 122 through OR-gate 124 fires single-shot 126, generating a stepdown via junction J26 and AND-gate 132 (FIG. 12).

Single-shot 138 (FIG. 11) inhibits, via junction J31, the trackholds 140 and 142 from setting up on any black video seen during the turnaround. This is necessary because internal delays cause the beam to be ahead of the video, and the beam could be onto an adjacent character at point 10. If the inhibit function of single-shot 138 were not used, this black video from adjacent characters would cause an extra, unwanted turnaround.

Figures 12, 13, 14, 15:
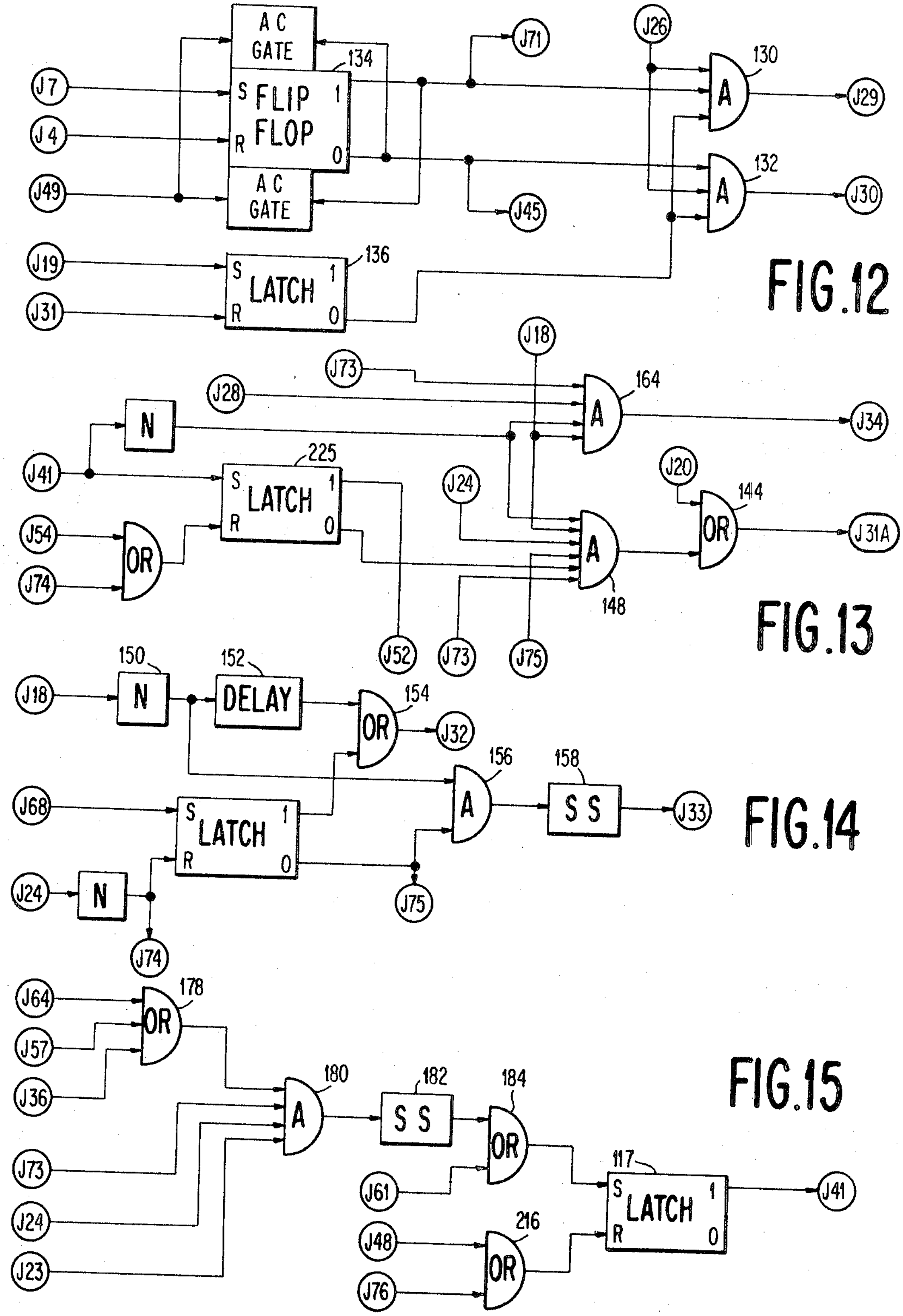
FIGS. 15, 16, 17 and 18 are detailed schematic diagrams of the systems for generating XY initialize signals.

The control of the beam sweep is now a function of the positions were black video occurs, while transitions are controlled by delay 152 and single-shot 158, FIG. 14.

Each time single-shot 126 is fired into junction J26, flip-flop 114 is toggled through either of AND-gates 160 and 162, and a stepdown occurs through AND-gate 132 and junction J30.

The black video at junction J18 (FIG. 13) is applied through an AND-gate 164 to a junction J34 and to set up Y MAX and Y MIN track and hold amplifiers 166 and 168 (FIG. 7), whereby amplifiers 166 and 168 are set up every time the character stroke is crossed.

When the beam sweeps from point 11 to point 12, no black video is seen, resulting in no update of the track and hold amplifiers. In FIG. 8, comparator 170 compares the horizontal position from summing amplifier 90 with a version of the stored X MAX value from amplifier 140 which has been shifted by a voltage divider 172. When comparator 170 applies to junction J35, a signal indicating that the horizontal position of the character is further right than the shifted stored X MAX value, the signal is applied to OR-gate 120 (FIG. 11), thereby causing the turnaround at point 12.

At point 13, a comparator 174 (FIG. 7) compares the vertical position of the beam from summing amplifier 62 with a version of the Y MIN value from amplifier 162 which has been shifted by a voltage divider 176. When comparator 174 applies to a junction J36, a signal indicating that the vertical position of the character is below the shifted stored Y MIN value, the signal is applied to an OR-gate 178 (FIG. 15). The output of the OR-gate is applied through an AND-gate 180 to fire a 5.6-microsecond single-shot 182. The resulting output pulse is applied through an OR-gate 184 to set latch 117, thereby starting the sweep from point 14 through point 15 to point 16. The character matrix is now set up as indicated by box 17 (FIG. 1B).

Because the beam is far to the right of the leftmost stored position, a comparator 190, FIG. 8, provides a signal to a junction J39 indicating that the beam is to the right of the leftmost position. Also because the beam is far below the highest stored position, a comparator 192, FIG. 7, provides a signal to a junction J40 indicating such.

When latch 117 (FIG. 15) is set, an UP output is applied to a junction J41. Latches 196 and 224, FIG. 18, are both reset at this time so J43 is UP and J42 and J51 are DOWN.

Figures 17, 18:
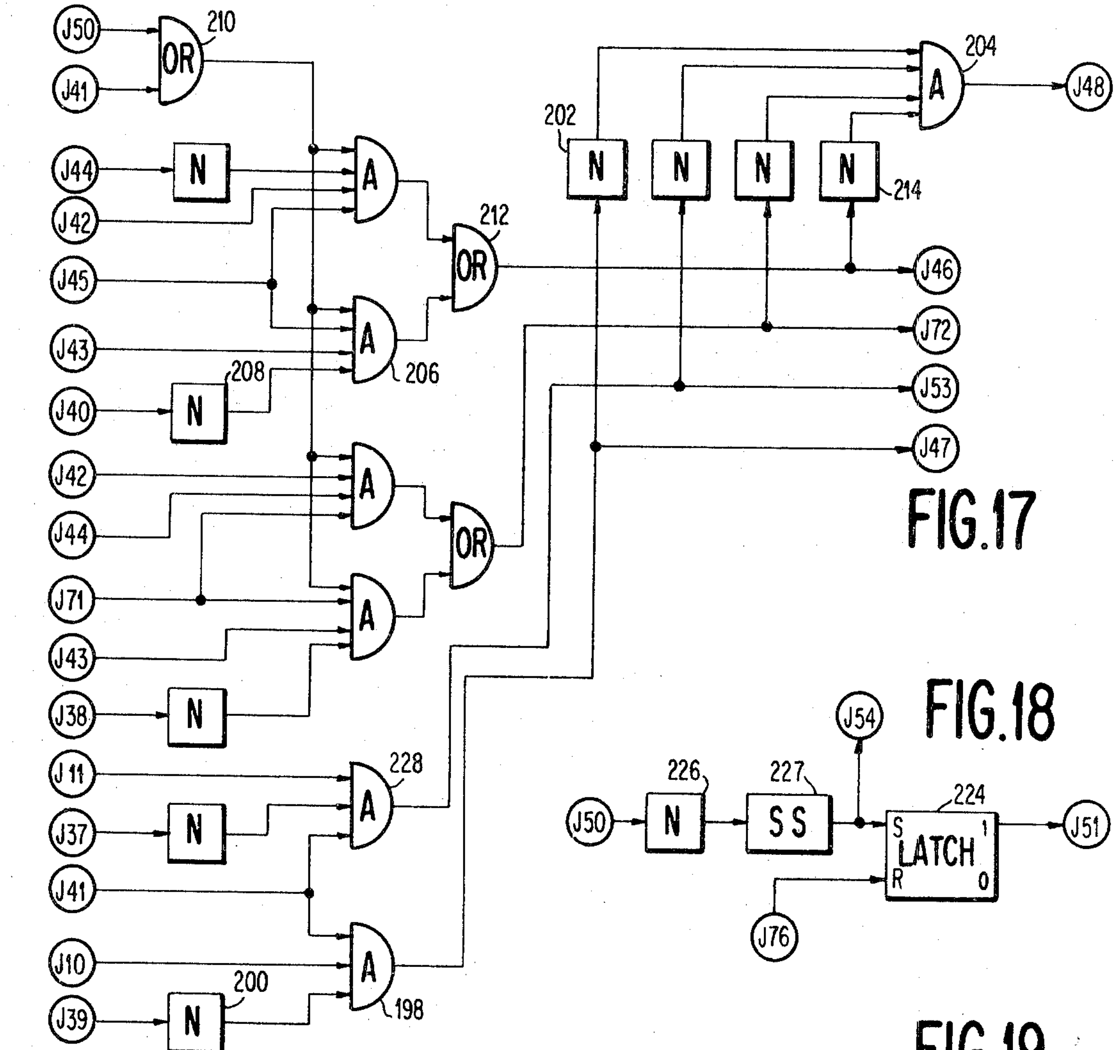

In FIG. 17, an AND-gate 198 receives the UP signal on junction J41, the step left signal on junction J10, and, via an inverter 200, a signal which enables the gate when the beam is not left of the leftmost stored position. Thus, the output of gate 198 is UP into an inverter 202, which disables an AND-gate 204.

Another AND-gate 206 receives a stepdown signal on junction J45 from flip-flop 134 (Fig. 12), a signal on junction J40, FIG. 7, through an inverter 208 which is UP when the beam is on the lower part of the character, a signal on junction J43 which is UP when latch 196 is RESET, and a signal from junction J41 via an OR-gate 210. Thus, the output of gate 206 is UP and is applied through an OR-gate 212 to a junction J46 and through an inverter 214 to AND-gate 204, inhibiting gate 204.

When the beam reaches point 15, the beam is no longer right of the leftmost stored position, and the signal on junction J39 goes UP, inhibiting gate 198. The signal on junction J47 goes DOWN, stopping the leftward movement of the beam.

The beam continues upward from point 15 to point 16, until the signal on junction J40 goes UP, indicating that the top part of the character has been reached, inhibiting gate 206. Then the signal on junction J46 goes down, stopping upward movement of the beam. Only gates 198 and 206, through inverters 202 and 214, were inhibiting AND-gate 204. Now gate 204 produces an UP output on junction J48.

The signal from junction J48 is applied, in FIG. 15, through an OR-gate 216 to reset latch 117, thereby causing a DOWN signal at junction J41 and an UP signal at the output of inverter 217.

Figure 16:
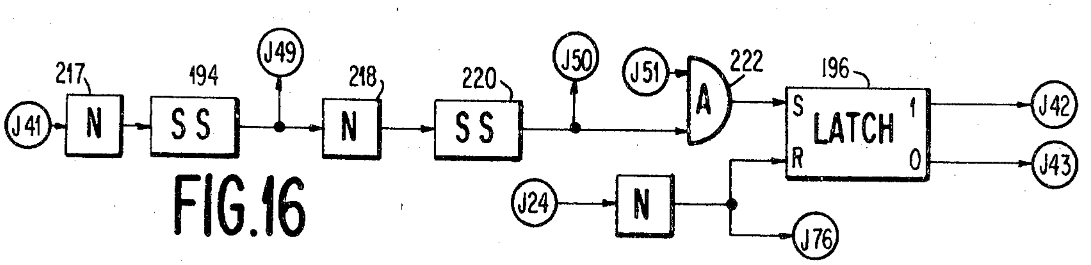

The signal at the output of inverter 217 is applied, in FIG. 16, to a 2.8-microsecond single-shot 194, generating a pulse which is applied to a junction J49 and an inverter 218. Note, J49 fires single-shot 126 of FIG. 11. When the output from single-shot 194 drops, inverter 218 fires another 2.8-microsecond single-shot 220 which applies an output pulse to a junction J50. Latch 224 is reset to inhibit AND-gate 222. When the output from single-shot 220 drops, inverter 226 fires single-shot 227, setting latch 224. This stores the fact that one-third of the setup scanning, i.e., the bottom part, has been done.

The set output on junction J41 from latch 117 also sets a latch 225 in FIG. 13 at point 14, FIG. 1C, thereby providing an UP output signal on a junction J52. This inhibits flip-flop 114 of FIG. 10 from being toggled when single-shot 126, FIG. 11, fires. Flip-flop 114 was preset to provide a sweep right signal at point 16 by the output of AND 198, FIG. 17, fire J47 during the sweep left from point 14 to point 15, FIG. 1C. Latch 225, FIG. 3, upon being set also inhibits AND 148. Thus preventing the trackholds from being updated by video that occurs during the point 14 to point 16 sweep. Also single-shot 124, FIG. 11, firing at point 16 inhibits AND 122, fires single-shot 138, OR 128 and inverter 146 from passing black video, i.e., J18 of FIG. 14, seen during the sweep from 14 to 16. Black video, as passed by AND 122, would cause an unwanted turnaround just after reaching point 16.

The setup of the top part of the character is done in a similar manner to the bottom part. Elements of the device which are symmetrical to those for the bottom part are used to set up the top of the character. The sweep takes place along the character from point 16 to point 17*a*.

When the top position is et up, the sweep from point 17*a* to point 18 and then to point 19 takes place in a manner similar to the movement from point 14 to point 15 to point 16. The character matrix is now set up as shown by box 20, (FIG. 1B). This time, when latch 117 is set and reset, one-third-done latch 224 is already set, providing an UP signal via junction J51 to AND-gate 222, enabling this gate. Resetting latch 117 provides a signal via single-shot 220 through gate 222 to set latch 196, referred to as the two-thirds-done latch.

As previously discussed, the scan now traces down the stored X MIN line to stored Y MIN and begins a checking scan of the bottom of the character at point 21 (FIG. 1D). This time, when latch 117 is set and reset, corresponding to point 22 in FIG. 1D, two-thirds-done latch 196 has already been set. Thus, resetting latch 117 causes a pulse output from single-shot 194 via junction J49 to an AND-gate 234 in FIG. 19. Gate 234 also receives on J42 a signal when the two-thirds-done latch is set, thereby setting latch 118 and putting a pulse on a junction J55. Latch 118 provides an up signal to a junction J56 and to AND-gates 236 and 238, enabling these gates. Now the stored matrix corresponds to block 23.

Back in FIG. 7, comparators 240 and 174 provide to junctions J57 and J36 signals indicating when the position of the beam is above Y MAX shifted and below Y MIN shifted. The signals on junctions J36 and J57 are applied to AND-gates 238 and 236, FIG. 19, respectively to generate outputs on junctions J58 and J59 to cause vertical sweep-up and sweep-down control of the beam for checking location of X MAX and X MIN, thereby maintaining the beam between shifted Y MAX and shifted Y MIN positions.

Figure 19:
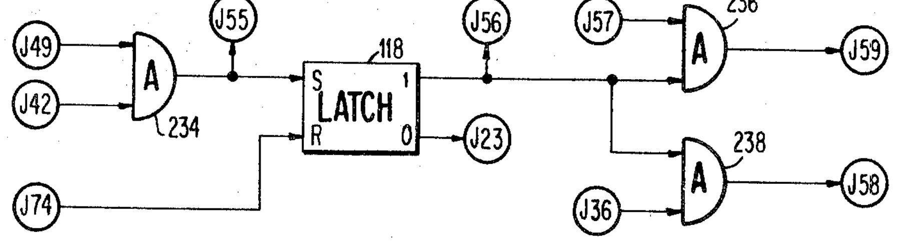
FIGS. 19, 20, and 21 are detailed schematic diagrams of the vertical blank scan-control and detection system.

In FIG. 5, the signals on junctions J58 and J59 pass OR-gates 82 and 70 and single-shots 84 and 72 to set and reset flip-flop 56. Thus AND-gates 54 and 52 cause the beam to sweep up or sweep down at 5,000 inches per second. AND-gates 54 and 52 have been previously enabled through OR-gate 46 by the signal on junction J56 from latch 118 (FIG. 19). Stepping right or left of the vertical beam is done using AND-gates 48 and 50. Stepping left is inhibited at points 24*a* and 27*a* by latch 245, FIG. 20, which is set as the beam reaches points 24 and 27. Latch 245 inhibits AND-gates 48 and 50, FIG. 5, until the top or bottom of the character has been reached to fire single-shot 72 or 84 to bring UP J9. J9 going away will fire single-shot 242, FIG. 20, resetting latch 245. Thus, all succeeding outputs from OR 74 will cause horizontal steps. This is the same logic as was used for the search raster from point 1 to point 4.

From point 22 to point 24, the same logic is used as from point 114 to points 15 and 16. Then the systems steps left from point 24 to point 25 between shifted Y MAX and shifted Y MIN. At the conclusion, a better value of X MIN has been found and stored, so the new character matrix is shown by block 26.

The beam then tracks from point 25 to points 26*a* and 27, where a scan shows no black video, thereby indicating that X MAX need not be revised.

Figure 21:
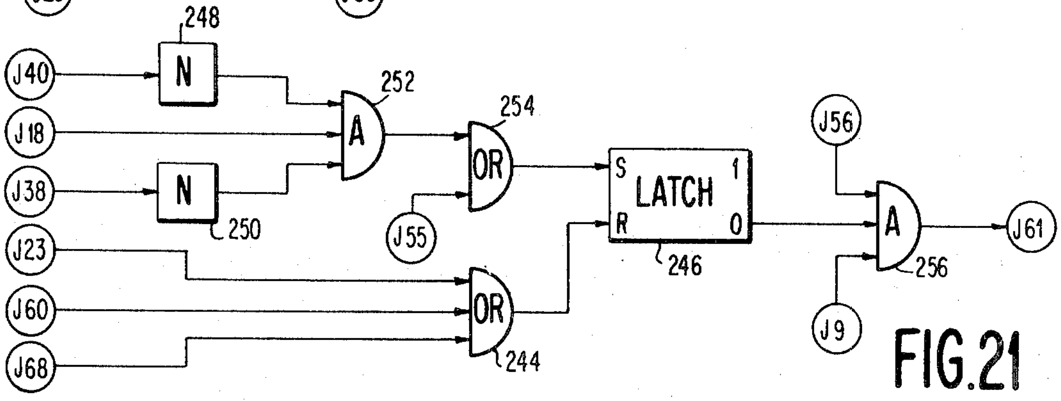

Detection of blank vertical scans is accomplished with latch 246 and AND 256 of FIG. 21.

If OR-gate 74, FIG. 5, provides a horizontal step signal on junction J9, a signal is provided through an inverter 240 (FIG. 20), through a single-shot 242, and via a junction J60 through an OR-gate 244 (FIG. 21) to reset a latch 246. When the vertical scan beam is between Y MAX and Y MIN, inverters 248 and 250 provide, from junctions J40 and J38, enabling signals to an AND-gate 252. Then when black video occurs on junction J18, AND-gate 252 provides, via an OR-gate 254, a set signal to latch 246 to drive its output, furnished to AND-gate 256, DOWN, inhibiting gate 256. But if no black video is seen during a scan, latch 246 remains reset, enabling gate 256 and producing a signal on junction J61 indicating that a vertical blank scan has been detected.

The signal on J61 is applied, in FIG. 9, to toggle flip-flop 92 to cause the right part of the character to be scanned and to change the step direction from left to right. The signal is applied, in FIG. 15, to OR-gate 184 to set latch 117, providing a signal on junction J41 to cause the sweep from point 25 to point 27.

The right scan check is done as was the left, but with the step direction changed. In the example of FIG. 1D the first scan is blank, causing latch 117 to be set by latch 246.

Figure 22:
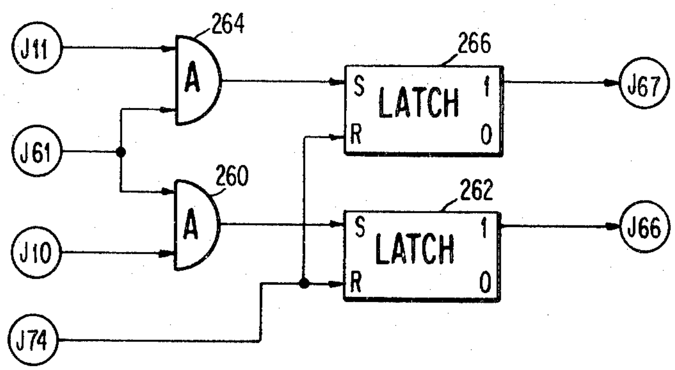

During the attempt to detect the first blank to the left of the character, the step left signal on junction J10 is UP. Thus, in FIG. 22, an AND-gate 260 is enabled, and passes a signal when vertical blank scan is detected which produces an UP signal on junction J61. This sets a latch 262, providing a left blank detected signal on junction J66. When the right part of the character is scanned, the step right signal is UP on junction J11, so an AND-gate 264 passes an output to set a latch 266, providing a right-blank-detected signal on junction J67.

Referring to FIG. 7, a junction J62 provides an analog signal equal to the value of an 80-mil-high character and a junction J63 provides an analog signal equal to the value of a 130-mil-high character. The top and bottom positions of the stored character matrix, from the Y MAX and Y MIN track and hold amplifiers 166 and 168, are used by a summing amplifier 258 to determine the height of the stored character matrix. This height is compared, in comparators 268 and 270, with the signals from junctions J62 and J63 to derive an UP output signal on junction J64 when the height is less than 80 mils and to derive an up output signal on junction J65 when the height is greater than 130 mils.

In FIG. 8, a comparator 272 compares the stored X MIN value with a shifted X MAX value to apply an UP signal to a junction J68 if the width of the character matrix is greater than 240 mils.

Figure 23:
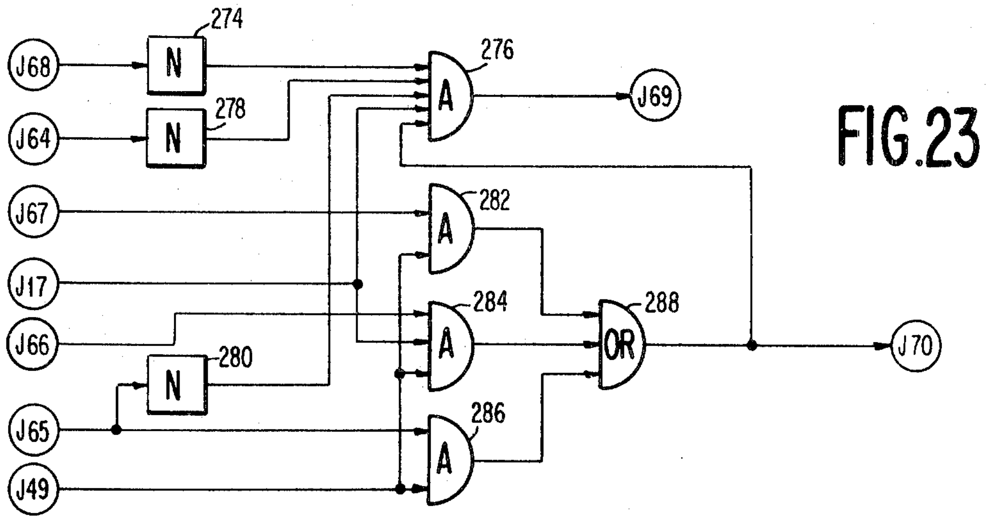

In FIG. 23, if the width of the character matrix is not greater than 240 mils, a DOWN signal on junction J68 passes inverter 274 as an UP signal to partially enable an AND-gate 276. If the height of the matrix is greater than 80 mils, a DOWN signal on junction J64 passes inverter 278 as an UP signal, partially enabling gate 276. If the height of the matrix is less than 130 mils, a DOWN signal on junction J65 passes inverter 280 as an UP signal, partially enabling gate 276. A signal on junction J17 indicating that an alphanumerical font is in use completes the enabling. Then a signal from either of AND-gates 282, 284, or 286 will pass OR-gate 288 to pass AND-gate 276 and apply an UP signal to a junction J69. The OR-gate 288 also applies an UP signal to a junction J70.

Thus gate 276 can only be satisfied by characters having dimensions in what is considered a valid range. An UP output on J69 from gate 276 indicates that the recognition raster can be positioned, the step at which the novel functions of the present invention stop and the prior art functions take over.

In the numerical handwriting mode, AND-gate 282 is satisfied by J67 after the right-blank-detection latch 262 is set. This is allowable because the direction of scan is known. Gate 282 activates gate 276, again causing the prior art recognition systems to take over.

If the character matrix is too large, as may occur with the group erase symbol, the mark is not to be read and high-speed search left should begin looking for new characters. The signal on junction J70 is applied to an AND-gate 290 in FIG. 4. A signal on either junction J64 or J65, indicating that the height of the character is wrong, passes an OR-gate 292, enabled AND-gate 290 and an OR-gate 294 to set latch 42, thereby starting high-speed search left.

Although a set of logic circuits has been disclosed for a preferred embodiment of the invention, numerous other arrangements of logic circuits could be devised to perform a similar function.

While the invention has been particularly shown and described with reference to preferred embodiments thereof, it will be understood by those skilled in the art that various changes in form and details may be made therein without departing from the spirit and scope of the invention.

What is claimed is:

1. A system for determining extremities of a two-dimensional character marking in at least three of four horizontal and vertical directions comprising:

a. means for directing a scanning spot onto a character position to produce a signal of a first type when said spot is on a marking and to produce a different signal when said spot is not in a marking, b. means for causing said spot to scan across said character marking in a direction approximately perpendicular to one of said four horizontal and vertical directions to reverse the direction of said scan in response to each occurrence of said different signal, c. means responsive to said different signal for causing said spot to step a short interval in said one direction each time the direction of said scan is reversed, d. storage means responsive to said signal of a first type for storing an indication of the location of the extreme value of said character marking in said one direction detected by said scanning spot, said indication being a function of the position of the scanning spot, and e. means for causing said storage means to store indications of the locations of the most extreme values of said character marking detected respectively in first and second additional directions, perpendicular to said one direction, during the scanning and stepping of said spot along said character marking in said one direction, f. said storage means further comprising means for successively storing only indications of the locations of more extreme values of said character marking each time said spot scans across said character at a location more extreme than those previously stored.

2. A system according to claim 1 further comprising means for stopping said spot from stepping in said one direction after a predetermined number of scans in which no signal of said first type occurs, 3. A system according to claim 1 further comprising means for stopping said spot from stepping in said one direction after a predetermined number of scans in which no signal of first type occurs, whereby said storage means then holds an indication of the location of the most extreme value of said character marking in said one direction.

4. A system according to claim 2 further adapted to determine the location of each of two opposite extremities of said character marking, one of said opposite extremities being said extremity in said one direction and the other of said opposite extremities being an extremity in a given direction opposite to said one direction, further comprising:

a. means responsive to the stopping of said spot from stepping in said one direction for causing said spot to scan across said character marking and to step a short interval in said opposite direction each time the direction of said scan is reversed, b. means for causing said storage means to store an indication of the location of the most extreme value of said character marking in said opposite direction determined during the scanning, and c. means for stopping said spot from stepping in said opposite given direction after a predetermined number of scans in which no signal of said first type occurs, whereby said storage means is then also hold an indication of the location of the most extreme value of said character marking in said opposite given direction.

5. A system according to claim 4 further comprising:

a. means responsive to the stopping of said spot from stepping in said opposite given direction for causing said to scan across said character marking in a direction parallel to said one and said opposite given directions in the regions respectively beginning just beyond the location of the most extreme value of said character marking as previously stored, in said first and said second additional directions to determine if locations more extreme than those previously stored which exist, b. means for causing said storage means to store indications of any said locations more extreme than those previously stored which exist, whereby said two opposite furtherest extremities and said first and second additional extremities are stored to indicate the full range of said character marking.

6. A method for determining extremities of a two dimensional character marking in at least three of four horizontal and vertical directions comprising the steps of:

a. directing a scanning spot onto a character position, b. scanning said spot across said character in a direction approximately perpendicular to one of said four horizontal and vertical directions and reversing the direction of the scanning each time said spot passes off of said character marking, c. stepping said spot a short distance in said one direction each time the direction of said scanning is reversed, d. detecting and storing an indication of the most extreme value of the location of said character marking in said one direction intersected while scanning, and e. detecting and storing indications of the locations of the extreme values of said character marking in first and second additional directions perpendicular to said one direction determined during the scanning and stepping of said spot along said character marking in said one direction, 7. A method according to claim 6 comprising the further step of stopping said scanning and stepping in said one direction after a predetermined number of scans in which no character marking is intersected.

8. A method according to claim 7 further adapted to determine the extremity of said character marking in a given direction opposite to said one direction comprising the further steps of:

a. reversibly scanning said spot and stepping said spot a short distance in said opposite given direction each time the direction of said scanning is reversed, b. storing an indication of the location of the most extreme value of said character marking in said opposite given direction intersected while scanning, and c. stopping said scanning and stepping in said opposite given direction after a predetermined number of scans in which no character marking is intersected.

9. A method according to claim 8 comprising the further steps of:

a. after stopping of said stepping and scanning in said opposite given direction, scanning said character marking in a direction parallel to said one and said opposite given directions in the regions respectively beginning just beyond the most extreme locations, as previously stored, of said extremities of said character marking in first and second additional directions to determine if locations more extreme than those previously stored exist, and b. storing indications of any said locations more extreme than those previously stored.

10. Apparatus for determining the bounds or extremities of a character marking contained on a document comprising:

means for positioning a scanning beam to a point on said document adjacent to said character marking and between the upper and lower extremities thereof;

means responsive to said scanning beam being positioned to said point for sweeping said scanning bean in a first serpentine search pattern to engage said character marking, the maximum excursions of said beam in said search pattern are less than the distance between the upper and lower extremities of said character marking;

means responsive to said beam engaging said character marking as said beam is swept in said first serpentine search pattern for sweeping said beam in a second serpentine search pattern normal to said first serpentine search pattern until the beam fails to intercept said character marking to locate the lower extremity of said marking;

means responsive to said beam while sweeping in said second serpentine pattern failing to intercept said character marking for moving said beam to a position above the position where said beam was swept in said second serpentine pattern and sweeping said beam in a third serpentine pattern normal to said first serpentine pattern and opposite to said second serpentine pattern until said beam fails to intercept said character marking to locate the upper extremity of said character marking;

means responsive to said beam failing to intercept said character marking while sweeping in said third serpentine pattern for moving said beam in a fourth serpentine pattern parallel to said first serpentine pattern and with excursions exceeding the space between the upper and lower extremities of said character marking as determined by said second and third serpentine sweep patterns to determine the left-hand boundary of said character marking;

means responsive to said forth serpentine sweep pattern determining said left-hand boundary of said character marking for moving said beam to the right of the position where said beam intercepted said character marking while sweeping in said first serpentine pattern and sweeping said beam in a fifth serpentine pattern parallel to and having excursions as great as said fourth serpentine pattern to determine the right-hand boundary of said character marking.

11. Apparatus for positioning a character for a recognition scanning beam comprising:

means for stepping in a first direction a scanning beam moving in a raster scanning pattern in second and third directions perpendicular to said first direction across the character marking from a point within said character marking until said beam fails to intersect said character marking to determine a first extremity of the character marking, means for storing said first extremity, means for stepping in a fourth direction the scanning beam moving in said raster scanning pattern across the character marking, said fourth direction being parallel and opposite to said first direction, until said beam fails to intersect the character marking to determine a second extremity of the character marking, means for storing said second extremity, means for detecting and storing indications of the most extreme locations of the character marking in said second and third directions during the stepping of the scanning beam in said first and fourth directions and means for stepping in the first direction the scanning beam moving in a raster scanning pattern in said second and third third directions starting at said first extremity until said beam fails to detect any character marking to determine the maximum extremity of the character marking in said first direction in the event of the disjointed character markings.

12. The apparatus in claim 11 further comprising:

means for stepping in the fourth direction the scanning beam moving in a raster scanning pattern in said second and third directions starting at said second extremity until said beam fails to detect any character marking to determine the maximum extremity of the character marking in said fourth direction in the event of disjointed character markings.

13. The apparatus in claim 11 further comprising:

means for stepping in said second direction the scanning beam moving in a raster scanning pattern in said first and fourth directions starting at the previously detected most extreme location in said second direction until said beam fails to detect any character marking to determine the maximum extremity of the character marking in said second direction in the event of disjointed character markings.

* * * * *